P. W. POWERS.
PROCESS OF MANUFACTURING EMBOSSED STEEL HANDLED IMPLEMENTS OF STEEL.
APPLICATION FILED JUNE 13, 1911.
1,020,158.    Patented Mar. 12, 1912.
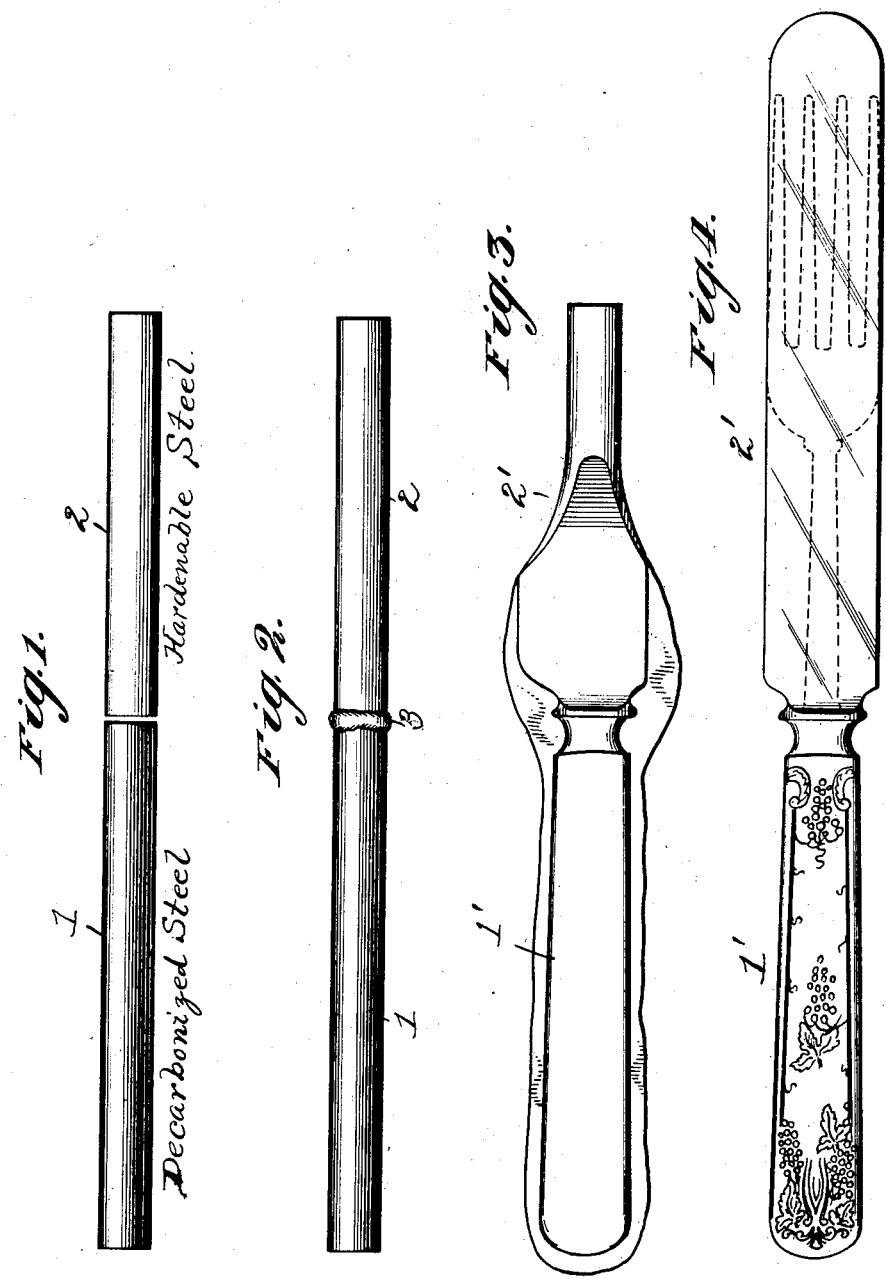

UNITED STATES PATENT OFFICE.

PATRICK W. POWERS, OF NORTHAMPTON, MASSACHUSETTS, ASSIGNOR TO WILLIAM WILSON LEE, OF NORTHAMPTON, MASSACHUSETTS; HELEN LEE ADMINISTRATRIX OF SAID WILLIAM WILSON LEE, DECEASED.

PROCESS OF MANUFACTURING EMBOSSED STEEL-HANDLED IMPLEMENTS OF STEEL.

1,020,158. Specification of Letters Patent. Patented Mar. 12, 1912.

Application filed June 13, 1911. Serial No. 632,880.

*To all whom it may concern:*

Be it known that I, PATRICK W. POWERS, citizen of the United States, residing at Northampton, in the county of Hampshire and State of Massachusetts, have invented certain new and useful Improvements in Processes of Manufacturing Embossed Steel-Handled Implements of Steel, of which the following is a specification.

This invention relates to a process (and its product) of manufacturing embossed steel-handled implements of steel, and more especially table knives and table forks of that description. Heretofore, such embossed, steel-handled steel implements have been made of a one-piece blank of hardenable steel. Prior to embossing the handles in embossing dies, such blanks, during the successive steps of the manufacturing process to which they are subjected, have been and are subjected to a steel-hardening process that renders the handles unduly hard to raise and fill the embossing dies in such wise as to receive with desirable distinctness the ornamental pattern or contours of the embossing dies. This is especially true where finer, as compared with coarser, impressions of the die contours are desired; and in all cases, such embossing of the hardened handles is unduly destructive of the die contour and also unduly expensive for power required to home the embossing dies on the hardened steel handles.

The object of this invention is to obtain on the steel handles better impressions of the ornamental contours or configurations of the embossing dies; to make it more practicable to use more richly and finely cut dies than heretofore; to lengthen the number of years of the embossing dies, which are expensive to make and which become blunted or broken down with undue rapidity when used on the hardened steel handles; and to economize in the power required in the embossing step.

The product of my new method may be readily produced, with rich and strikingly artistic embossed ornamentation on the handles, at a minimum of factory expense as compared with the older process heretofore and now in use.

The invention is illustrated in the accompanying drawings, in which,

Figure 1 represents a view of the two blanks before welding; Fig. 2 is a similar view of the composite blank after the weld; Fig. 3 is a view of the blank after being drop-forged and before trimming; and Fig. 4 is a view of the completed article, the knife blade being shown in full lines and a fork in dotted lines.

According to my new process, a soft steel handle-forming blank 1 and a hardenable steel implement-forming blank 2 are assembled end to end preparatory to electrically welding them together. The handle-forming blank is preferably of dead, soft steel—that is, steel that does not contain carbon and which therefore will not be hardened during any of the subsequent operations. Usually the inner or opposed ends of these two blanks are butt-jointed. They are then electrically welded into a single composite blank, the implement-forming portion of which is of hardenable steel and the handle-forming portion of which is of very soft steel, as stated. During the welding operation the two assembled portions are pressed strongly together, with the result of forming an upset or flange-like irregular projection 3 around the blank. This projection is ground off in order that the one-piece composite blank produced may be inserted in drop-forging dies. I find in practice that while, as a result of the electrical welding operation, the projection itself is quite hard, yet, on grinding it off, the underlying metal is of substantially its original character, one portion being soft and practically non-hardenable and the other being hardenable, as already indicated.

After the removal of the upsets or projections, the composite blanks are raised to drop-forging heat prior to drop-forging in drop-forging dies. I find in practice, as already stated, that the welding operation does not result in a hardening of the handle portion on the cooling of the blank, and that the raising of the blank to drop-forging heat does not result in a hardening of the handle portion on cooling. After the drop-forging operation, the drop-forged blanks are removed from the drop-forging dies; the "stub-piece" or implement-forming portion is then drawn into proper approximate shape for a blade, fork or other implement 2'; the drawn blank is then subjected to the action of trimming dies; the blade, fork or implement portion is then subjected to a hardening operation, of well-known kind (but without any hardening of the handle, by reason of its being of steel without carbon.); the handle of the blank is next rough-ground; the next step is to grind or finish the blade, fork or implement, and the next step is to finish the handle 1' and bolster of the implement. The last and final step is that of subjecting the so-treated and otherwise finished implement to pressure in the embossing dies, on the interiors of which patterns of any desired kind may be made. By reason of the fact that the handle is of dead soft or decarbonized steel (of course if the steel handle contained a negligible amount of carbon no objection would be presented), it will readily yield to perfect embossment in the embossing dies when they are compressed upon the handle.

What I claim is:—

The process of making embossed steel-handled knives, forks and other implements of steel, consisting in electrically welding into one composite blank a handle-forming piece of substantially decarbonized steel and an implement-forming piece of hardenable steel; in converting said composite blank into the implement desired, leaving the handle-forming piece unhardened; and in embossing the handle in compression-embossing dies.

In testimony whereof I have affixed my signature in presence of two witnesses.

PATRICK W. POWERS.

Witnesses:
ROBERT T. LEE,
CHAS. E. CREGAN.